Figure 1:
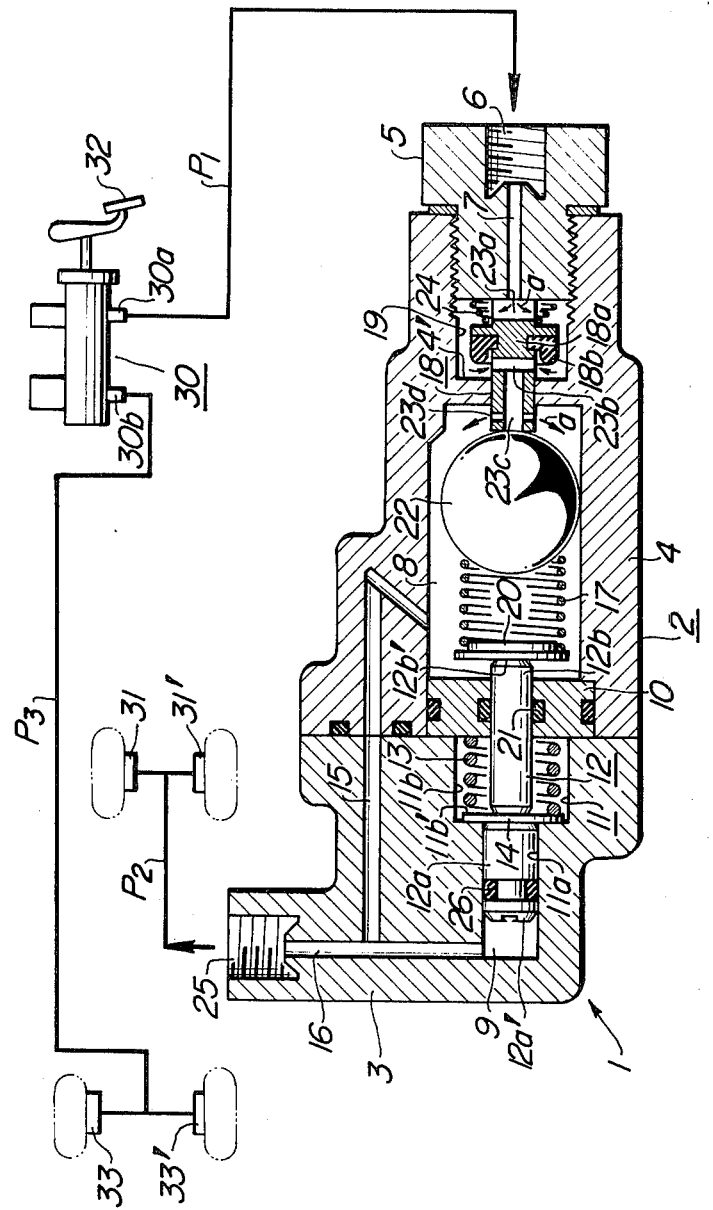

United States Patent [19]

Nogami

[11] 4,125,291
[45] Nov. 14, 1978

[54] HYDRAULIC BRAKE PRESSURE CONTROL APPARATUS FOR USE WITH A VEHICLE

[75] Inventor: Tomoyuki Nogami, Toyota, Japan

[73] Assignee: Toyota Jidosha Kogyo Kabushiki Kaisha, Toyota, Japan

[21] Appl. No.: 815,834

[22] Filed: Jul. 14, 1977

[30] Foreign Application Priority Data

Nov. 16, 1976 [JP] Japan .................. 51-137547

[51] Int. Cl.$^2$ ........................................... B60T 13/06
[52] U.S. Cl. .................................. 303/24 F; 303/24 A
[58] Field of Search .................. 303/6 C, 22 R, 24 A, 303/24 C, 24 F

[56] References Cited

U.S. PATENT DOCUMENTS

| | | | |
|---|---|---|---|
| 3,245,729 | 4/1966 | Shellhause | 303/24 F |
| 3,252,740 | 5/1966 | Stelzer | 303/24 F X |
| 3,795,424 | 3/1974 | Lewis | 303/24 F X |
| 3,881,786 | 5/1975 | Hayes | 303/24 F |

Primary Examiner—Duane A. Reger
Attorney, Agent, or Firm—Cushman, Darby & Cushman

[57] ABSTRACT

A hydraulic brake pressure control apparatus for use with a vehicle including a housing having an inlet opening connected to a master brake cylinder and an outlet opening connected to rear wheel brake cylinders, the inlet and outlet openings being normally hydraulically communicated with each other. In the housing are disposed an inertia mass member and valve means which cooperate to control the communication between the inlet and outlet openings. Also a differential piston assembly is disposed in the housing, and a spring is mounted between the piston assembly and the inertia mass member. The inertia mass member is biased by the spring to normally engage the valve means to move the latter to an open position, and displaced against the force of the spring to thereby move the valve means to a closed position when the vehicle deceleration reaches a predetermined level. The differential piston assembly detects the hydraulic pressure supplied into the housing, and is moved to compress the spring to cause the latter to exert increased force on the inertia mass member when the hydraulic pressure for obtaining the predetermined level of the vehicle deceleration is increased due to the increased load on the vehicle.

8 Claims, 2 Drawing Figures

HYDRAULIC BRAKE PRESSURE CONTROL APPARATUS FOR USE WITH A VEHICLE

The present invention relates to a brake system for a vehicle and more particularly to a hydraulic brake pressure control apparatus of a deceleration responsive type for controlling hydraulic pressures delivered to the hydraulic wheel brake cylinders by sensing deceleration of the associated vehicle upon the braking operation thereof.

As is well known in the art, during deceleration of a vehicle, a portion of weight borne by the rear wheels of the vehicle is transferred to the front wheels, resulting in an increased proportion of weight acting on the front wheels and a correspondingly decreased proportion of weight acting on the rear wheels. The proportion of weight transferred to the front wheels becomes higher, as the deceleration is increased. Thus, there may arise a danger that the rear wheels should be locked prior to the locking of the front wheels when the same magnitude of braking force is applied to both the front and rear wheels involving undesirable slip of the rear wheels. In order to prevent such slip, it is necessary to decrease the proportion of brake force applied to the rear wheels as the deceleration increases. To this end, it has already been proposed to provide a hydraulic brake pressure control apparatus in a hydraulic circuit between a master brake cylinder and hydraulic brake cylinders for the rear wheels, thereby to control the hydraulic pressures applied to the rear wheel brake cylinders in dependence upon the deceleration of vehicle.

In a hitherto known typical brake pressure control apparatus, an inertia valve element of a spherical body is accommodated within an inclined hydraulic pressure chamber. When the magnitude of deceleration of vehicle attains a predetermined value, the spherical valve element is rollingly displaced over the inclined path upwardly in the hydraulic pressure chamber to sit on a valve seat under the inertia force produced upon the deceleration, whereby flow of brake oil from the master cylinder to the rear wheel brake cylinders is interrupted. This structure of the hydraulic brake pressure control apparatus is however disadvantageous in that the magnitude of deceleration which gives rise to the rolling displacement of the spherical inertia valve element is fixedly set at a constant level as defined by the inclined angle of the hydraulic chamber, so that it is impossible to control the brake force applied to the vehicle wheels under consideration of the weight of vehicle. In other words, the ideal or desirable distribution ratio of the hydraulic brake pressure delivered to the front and rear wheel brake cylinders will vary significantly in dependence upon the weight of the associated vehicle, e.g. whether the vehicle is loaded or unloaded. In the case of the hitherto known brake pressure control apparatus described above, when the weight of vehicle becomes doubled, the hydraulic pressure at which the displacement of the inertia mass valve member can take place at a predetermined level of deceleration will become merely correspondingly doubled without involving desired variation in the distribution ratio of the hydraulic brake pressure between the front and the rear wheel brake systems. Thus, in the case where the hitherto known hydraulic brake pressure control apparatus is applied to a vehicle which exhibits a great difference in weight at loaded and unloaded conditions, the performance characteristics of the apparatus remains substantially the same regardless of whether the vehicle is loaded or unloaded. Accordingly, if the performance of such control apparatus is adjusted to suit to the unloaded condition of a vehicle, the control function of the apparatus will become remarkably different from the desired one which is required for the loaded vehicle having an increased weight, since no consideration is paid to the variations in the distribution ratio of hydraulic pressure between the front and rear brake systems as a function of difference in weight of the vehicle.

In order to overcome the above-discussed disadvantage, there has been proposed an apparatus which comprises a pivotal lever disposed at the bottom of the hydraulic pressure chamber for receiving therein the spherical valve element. The valve element is placed on an upper surface of the pivotal lever and is movable along the latter surface. In this apparatus, the pivotal lever makes a pivotal movement to vary the inclination of the upper surface thereof when the hydraulic pressure for obtaining the predetermined value of deceleration is varied due to the varied load condition of the vehicle. With the varied inclination of the upper surface described above, the deceleration value which causes the upward rolling movement of the valve element is varied. However, this apparatus has a disadvantage such that the structure for varying the inclination is complicated and increases the number of parts incorporated in the apparatus.

An object of the invention is to eliminate the drawbacks of hitherto known hydraulic brake control apparatus described above and to provide a novel and improved construction of a hydraulic brake pressure control apparatus of a deceleration responsive type which permits to obtain a desired distribution ratio of hydraulic brake pressure between front and rear wheel brake systems in consideration of the actual weight of an associated vehicle.

Another object of the invention is to provide a hydraulic brake pressure control apparatus which is simple in construction and can be manufactured inexpensively and installed in existing vehicles without any substantial modifications.

With the above objects in view, there is proposed according to one aspect of the invention a hydraulic brake pressure control apparatus for use with a vehicle comprising a housing having an inlet and outlet openings for a hydraulic pressure medium, passage means formed in the housing and normally communicating the inlet and outlet openings, means responsive to the deceleration of the vehicle to close the passage means to thereby interrupt the communication between the inlet and outlet openings, the deceleration responsive means including an inertia mass member disposed in the housing and displaceable in response to the deceleration of the vehicle, and means responsive to the hydraulic pressure supplied into the housing to exert on the inertia mass member a force of variable magnitude acting against the displacement of the inertia mass member in response to the deceleration of the vehicle.

According to another aspect of the invention, the hydraulic pressure responsive means comprises differential piston means disposed in the housing and being slidable in accordance with the hydraulic pressure exerted on both ends thereof, first spring means for adjusting the sliding movement of the piston means, and second spring means mounted between the piston means and the inertial mass member.

Figure 2:
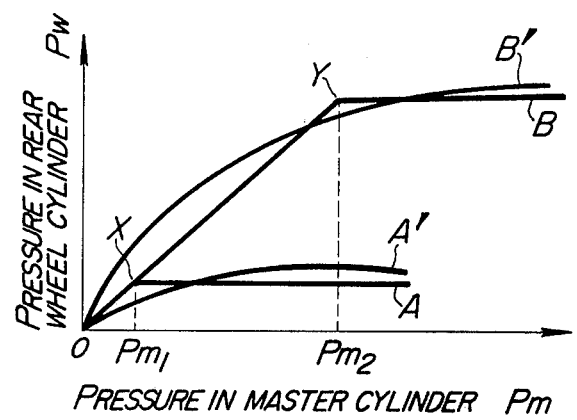

Above and other objects, features and advantages of the invention will become more apparent from the detailed description of a preferred embodiment of the invention shown, by way of example only, in the accompanying drawings, in which:

FIG. 1 shows in a longitudinal sectional view a hydraulic brake pressure control apparatus according to an embodiment of the invention together with a hydraulic circuit for a hydraulic brake system shown in a schematic diagram, and FIG. 2 graphically illustrates relationships between pressures in a master cylinder and a rear wheel brake cylinder as attained with the use of a hydraulic brake pressure control apparatus according to the invention in comparison with desirable or ideal ones.

Referring to FIG. 1, a hydraulic brake pressure control apparatus of a deceleration responsive type according to an embodiment of the invention as generally denoted by reference numeral 1 is disposed between conduits $P_1$ and $P_2$ which connect a hydraulic pressure medium outlet port 30a for a rear wheel brake system formed in a tandem type master cylinder 30 to rear wheel brake cylinders 31 and 31'. The master cylinder 30 has also a hydraulic pressure medium outlet port 30b which is directly connected to front wheel brake cylinders 33 and 33' through a conduit $P_3$. The master cylinder 30 is adapted to be actuated by a brake pedal 32 thereby to supply the hydraulic brake medium or oil to the front wheel brake cylinders 33 and 33' as well as to the rear wheel brake cylinders 31 and 31' simultaneously through the outlet ports 30b and 30a, respectively. It should be noted that the hydraulic brake pressure control apparatus 1 is installed on a vehicle in such an orientation that the left-hand side of the apparatus 1 as viewed in FIG. 1 is positioned at the front side of the vehicle.

As can be seen from FIG. 1, the hydraulic brake pressure control apparatus 1 has a housing 2 which is composed of a left-hand side housing section 3, a right-hand side housing section 4 and a plug block 5 threadedly mounted on the right-hand side housing section 4 at the right-hand side end portion thereof. There is formed in the plug block 5 an inlet opening 6 to which the hydraulic conduit $P_1$ extending from the outlet port 30a of the master cylinder 30 is connected. The plug block 5 is also formed therein with a passage 7 which serves to communicate the inlet opening 6 with a first hydraulic pressure chamber 8 through a valve apparatus 18 described hereinafter. The left-hand side housing section 3 is formed with an outlet port 25 at the front or outer side thereof from which the conduit $P_2$ extends to the rear wheel brake cylinders 31 and 31'.

Formed within the housing 2 in addition to the first hydraulic pressure chamber 8 is a bore 11 having offset inner walls and positioned adjacent to the first hydraulic chamber 8 but separated therefrom through a partition wall 10. The bore 11 is composed of a left bore portion 11a of a small diameter and a right bore portion 11b of a large diameter as viewed in FIG. 1. There is accommodated within the large diameter bore portion 11b a movable plate or disk 14 which is biased against the left end wall 11b' of the large diameter bore portion 11b under influence of a first compression spring 13 having a predetermined spring force. A plunger 12a of a large diameter is accommodated slidably within the small diameter bore portion 11a in a sealing manner through a seal member 26. The plunger 12a has a front or left end wall 12a' defining a second hydraulic pressure chamber 9 formed in the housing section 3. A small diameter plunger 12b extends slidably through the partition wall 10 in a fluid tight manner by means of a seal member 21, and has one end portion projecting into the first hydraulic pressure diameter 8. The other end portion of the plunger 12b projects into the large diameter bore portion 11b and abuts against the large diameter plunger 12a with the movable plate 14 interposed therebetween. In this manner, the plungers 12a and 12b as well as the movable plate 14 which are axially aligned with one another constitute a differential plunger or piston assembly 12 which is axially slideable as a unit.

The first hydraulic pressure chamber 8 is communicated with the second hydraulic pressure chamber 9 and hence to the outlet port 25 through communication passages 15 and 16. Accordingly, the hydraulic pressure applied to the first hydraulic pressure chamber 8 is transmitted to the second hydraulic pressure chamber 9 and hence to the rear wheel brake cylinders 31 and 31' through the outlet port 25 and the conduit $P_2$. In this connection, it will be appreciated that the hydraulic pressure applied to the first and second hydraulic pressure chambers 8 and 9 will act on the pressure receiving portions or both end faces of the differential piston assembly 12, i.e. the right-hand end face 12b' of the small diameter plunger 12b and the left-hand end face 12a' of the large diameter plunger 12a, as viewed in FIG. 1. Consequently, the differential piston assembly 12 is urged to move toward the first hydraulic pressure chamber 8 against the force exerted by the first spring 13 under the differential force which is produced due to the difference between the effective areas of the end faces 12b' and 12a' of the plunger or piston assembly 12. The sliding displacement of the differential piston assembly 12 toward the first hydraulic pressure chamber 8 can be adjusted to a proper amount by selecting the spring force of the first spring 13. Further, the differential plunger or piston assembly 12 may be returned toward the second pressure chamber 9 with the aid of the spring force of the first spring 13, when the hydraulic pressure prevailing in the pressure chambers 8 and 9 is decreased to a predetermined level. In this conjunction, it should be mentioned that the force of a second spring 17 having a function described hereinafter is too small to adjust or regulate effectively the displacement of the plunger assembly 12.

Referring again to FIG. 1, there is further accommodated within the first hydraulic pressure chamber 8 a rotatable inertia mass member 22 of a spherical configuration, while a valve device 18 is disposed between the first hydraulic pressure chamber 8 and the inlet port 6 to serve for blocking the flow of hydraulic oil into the first hydraulic pressure chamber 8 at predetermined levels of decelerations. The valve device 18 comprises a valve body 18a which extends through a space 19 defined between the plug block 5 and the right-hand side housing section 4 and has an end portion protruding into the first hydraulic chamber 8 and a rubber ring 18b fitted on the valve body 18a. Oil flow passages 23a to 23d are formed in the valve body 18 in a manner as illustrated in FIG. 1 so that hydraulic pressure medium or oil from the communication passage 7 may flow into the first pressure chamber 8 through the oil flow passages 23a to 23d as indicated by arrows a when the valve device 18 is in the open position shown in FIG. 1. On the contrary, when the valve device 18 is in the closed position in which the valve device 18 has been moved to the left as viewed in FIG. 1 from the position shown in this figure thereby to cause the rubber ring 18b to abut against an opposite wall surface 4' of the housing section 4, the oil flow into the first hydraulic chamber 8 is interrupted. It will be noted that the valve device 18 is constantly biased toward the left by means of a third spring 24 disposed between the right-hand side end face of the valve body 18a and the inner end wall surface of the plug block 5. The third spring 24 has a spring force smaller than that of the second spring.

The second spring 17 is interposed between the differential plunger or piston assembly 12 and the inertia mass member 22 in the first hydraulic pressure chamber 8. In more detail, the second spring 17 has one end operatively connected to the differential plunger assembly 12 through a disk or spring seat 20 and the other end which serves to resiliently support the spherical inertia mass member 22. With the spring force of the second spring 17, the inertia mass member 22 is urged to constantly abut on the valve device 18 and normally press the latter rightwardly, against the force of the third spring 24, into the open position shown in FIG. 1. When the inertia mass member 22 is rolled toward the left-hand side against the force of the second spring 17 under inertia force produced upon deceleration of the vehicle attaining a predetermined value, the valve 18 is displaced to the left toward the closed position under the restering effort exerted by the third spring 24. Further, when the differential plunger or piston assembly 12 is axially rightwardly displaced in response to the differential force produced thereacross as described hereinbefore, the second spring 17 tends to be compressed to increase the spring force thereof acting on the inertia mass member 22. For example, when the hydraulic pressure in the first and second pressure chambers 8 and 9 required for attaining a predetermined deceleration is increased due to an increase in the weight of vehicle with an increased load, the differential piston assembly 12 is displaced toward the first hydraulic pressure chamber 8 for a distance corresponding to the increase in the hydraulic pressure, with the result that the spring force of the second spring 17 acting on the inertia mass member 22 is also correspondingly increased.

Now, the operations of the hydraulic brake pressure control apparatus of the structure mentioned above will be described with reference to FIGS. 1 and 2.

When the brake pedal 32 is actuated during running of the vehicle under no load condition, the hydraulic pressure generated in the master cylinder 30 is transmitted directly to the brake cylinders 33 and 33' for the front wheels through the oil outlet port 30b of the master cylinder 30 and the conduit $P_3$, and at the same time the hydraulic pressure in the master cylinder 30 is applied from the outlet port 30a to the first hydraulic pressure chamber 8 through the conduit $P_1$, the inlet port 6, the communication passages 7 and the passages 23a to 23d formed in the valve device 18. The pressure applied to the first pressure chamber 8 is then transmitted also to the second hydraulic pressure chamber 9 through the communication passages 15 and 16, and in turn to the rear wheel brake cylinders 31 and 31'. When the hydraulic brake pressure is applied to the front and rear wheel brake cylinders 31; 31' and 33; 33' in this manner, the vehicle is braked in dependence upon the magnitude of the pressure applied to the brake cylinders.

FIG. 2 graphically illustrates a relationship between hydraulic pressure $P_n$ in the master cylinder and hydraulic pressure $P_w$ in the rear wheel brake cylinder. In this figure, performance of the hydraulic brake system utilizing the hydraulic brake pressure control apparatus according to the invention in the unloaded vehicle condition is illustrated by a characteristic curve A. As can be seen from this performance curve A, the hydraulic pressure $P_w$ in the rear wheel brake cylinder will continue to increase as the hydraulic pressure $P_m$ in the master cylinder is increased until the hydraulic pressure $P_m$ has attained a predetermined value $P_{m1}$ at which the deceleration of vehicle reaches a predetermined level $g_1$, say 0.3 g (refer to the region O—X in FIG. 2). In the meantime, when the differential force produced across the differential plunger or piston assembly 12, which urges the assembly 12 toward the right-hand side as viewed in FIG. 1, overcomes the resilient counter force of the first spring 13, the differential piston assembly 12 is displaced to the right, whereby the second spring 17 is compressed to store the increased restoring energy therein. When the hydraulic pressure $P_m$ in the master cylinder has attained the predetermined value $P_{m1}$ with the deceleration reaching the predetermined level $g_1$, the spherical inertia mass member 22 will then be rollingly moved in the direction toward the front side of the vehicle (i.e. to the left-hand side as viewed in FIG. 1), with the result that the valve device 18 is moved to the closed position to block the flow of hydraulic brake oil into the first hydraulic pressure chamber 8. Accordingly, the performance curve A becomes flat or horizontal in the range in which the hydraulic pressure $P_m$ in the master cylinder 30 is higher than the predetermined value $P_{m1}$. This means that the hydraulic pressure $P_w$ in the rear wheel brake cylinder will remain constant independently from any further increase in the hydraulic pressure $P_m$ in the master cylinder. In this manner, the performance characteristic curve A is made approximate to the ideal performance curve A' which represents an ideal or desirable distribution ratio of hydraulic brake pressure, as is known in the art.

The performance characteristic attained under a loaded condition of a vehicle provided with the hydraulic brake control apparatus according to the invention is illustrated by the curve B in FIG. 2. When the brake pedal 32 is actuated during the operation or running of the vehicle under loaded condition, the hydraulic pressure $P_m$ in the master cylinder 30 is transmitted to the wheel brake cylinders 31; 31' and 33; 33' in a similar manner as is in the case of the no-load operation of the vehicle, as a result of which the latter is braked. In this case, however, it should be noted that no displacement of the inertia mass member 22 will occur even when the hydraulic pressure $P_m$ in the master cylinder 30 has attained the predetermined value $P_{m1}$, since the vehicle deceleration remains lower than the predetermined value $g_1$. Besides, even when the deceleration has attained the predetermined value $g_1$, with the corresponding increase in the hydraulic pressure within the master cylinder, the inertia mass member 22 will not be displaced, because of the increased counter force of the second spring 17 which has been compressed due to the displacement of the differential plunger or piston assembly 12 toward the right-hand side as viewed in FIG. 1. Accordingly, the hydraulic oil flow into the first hydraulic pressure chamber 8 will be maintained. However, when the deceleration has attained a predetermined level $g_2$, say of 0.6 g, higher than the aforementioned level $g_1$ as the hydraulic pressure $P_m$ in the master cylinder is increased to a value $P_{m2}$, the inertia mass member 22 will the be displaced in the direction toward the front side of the vehicle by overcoming the increased counter force of the second spring 17 thereby to allow the valve device 18 to be closed to interrupt the brake oil flow into the first hydraulic chamber 8. Succeeding operations of the hydraulic brake control apparatus is substantially same as the case of the no load operation of the vehicle. In this manner, when the vehicle is driven under loaded condition, the hydraulic pressure $P_w$ in the rear wheel cylinder will increase as the pressure $P_m$ in the master cylinder 30 is increased so far as the pressure $P_m$ remains lower than the second predetermined value $P_{m2}$, as indicated by a line segment O–Y of the performance curve B shown in FIG. 2. In the range in which the hydraulic pressure $P_m$ in the master cylinder is higher than the second predetermined value $P_{m2}$, the performance curve B becomes flat or horizontal, approximating the desired performance curve B' representing the deal distribution ratio of the hydraulic pressure at the loaded operation of the vehicle (refer to FIG. 2).

As will be appreciated from the foregoing description, in the hydraulic brake pressure control apparatus of the deceleration responsive type according to the invention, magnitude of the deceleration which causes the displacement of the inertia mass member can be automatically variably set in accordance with the weight of the associated vehicle. By virtue of this features, the distribution ratio of hydraulic pressure delivered to the front and the rear wheel cylinders can be advantageously approximated to the ideal distribution ratio both in the unloaded and loaded operations of the vehicle.

What is claimed is:

1. A hydraulic pressure control apparatus for use with a vehicle comprising:
   a housing having an inlet and outlet openings for a hydraulic pressure medium;
   passage means formed in said housing and normally communicating said inlet and outlet opening;
   an inertia mass member disposed in said housing and displaceable in response to the deceleration of said vehicle;
   means operatively associated with said inertia mass member to close said passage means in direct response to the movement of said inertia mass member, thereby interrupting the communication between said inlet and outlet openings;
   means responsive to the hydraulic pressure applied to said housing to exert on said inertia mass member a force of variable magnitude acting against displacement of said inertia mass member in response to the deceleration of the vehicle; and
   said hydraulic pressure responsive means including differential piston means disposed in said housing and being slidable in response to hydraulic pressure exerted thereon, and spring means mounted between said piston means and said inertia mass member.

2. The control apparatus as claimed in claim 1 wherein other spring means are provided for adjusting the sliding movement of said differential piston means.

3. A control apparatus as defined in claim 1, wherein said deceleration responsive means further includes valve means disposed in said housing and operable in association with said inertia mass member, said valve means having an open position and a closed position and normally resiliently biased to the open position, said valve means being moved to the closed position upon displacement of said inertia mass member in response to the deceleration of said vehicle.

4. A control apparatus as defined in claim 1, wherein said housing is formed therein with a first hydraulic pressure chamber hydraulically connected through said valve means with said inlet opening and a second hydraulic pressure chamber hydraulically communicated with said outlet opening, said first and second chambers being hydraulically communicated with each other, and said differential piston means is slidably disposed between said first and second chambers and adapted to be displaced under differential force produced due to the hydraulic pressure exerted on both ends thereof.

5. A control apparatus as defined in claim 4, wherein said inertia mass member is disposed in said first chamber, said spring means is mounted in said first chamber between said piston means and said inertia mass member, and said valve means is disposed between said inlet opening and said first chamber in opposition to said inertia mass member, said spring means biasing said inertia mass member to normally bring the latter into engagement with said valve means to move said valve means to the open position.

6. A control apparatus as defined in claim 4, wherein said differential piston means includes a first portion of small diameter and a second portion of large diameter, said first portion having one end exposed to said first chamber while said second portion having one end exposed to said second chamber.

7. A control apparatus as defined in claim 5, wherein said valve means is constantly biased toward the closed position by spring means having a spring force smaller than that of said first-mentioned spring means, whereby said valve means is moved to the closed position due to the spring force of said spring means when said inertia mass member is displaced against the spring force of said first-mentioned spring in response to the deceleration of said vehicle.

8. A control apparatus as defined in claim 1, wherein said inertia mass member has a spherical configuration.

* * * * *